United States Patent Office 2,713,160
Patented July 12, 1955

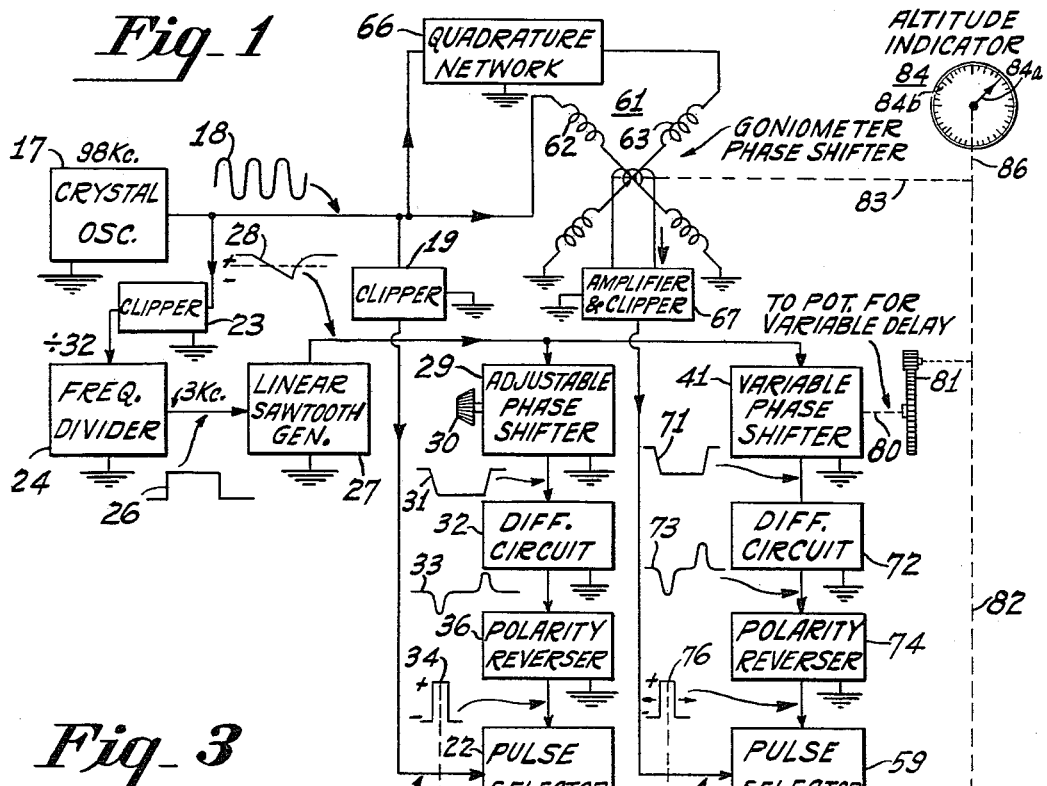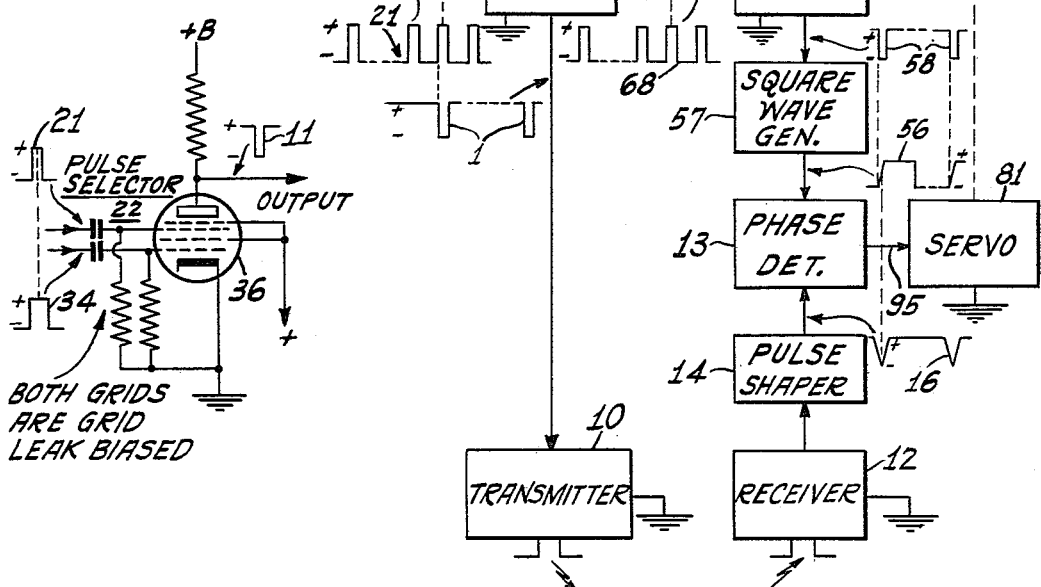

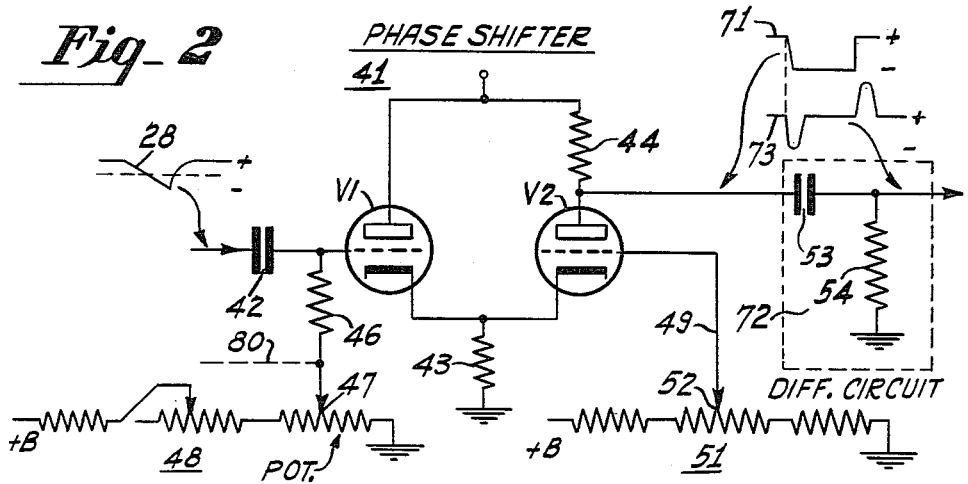
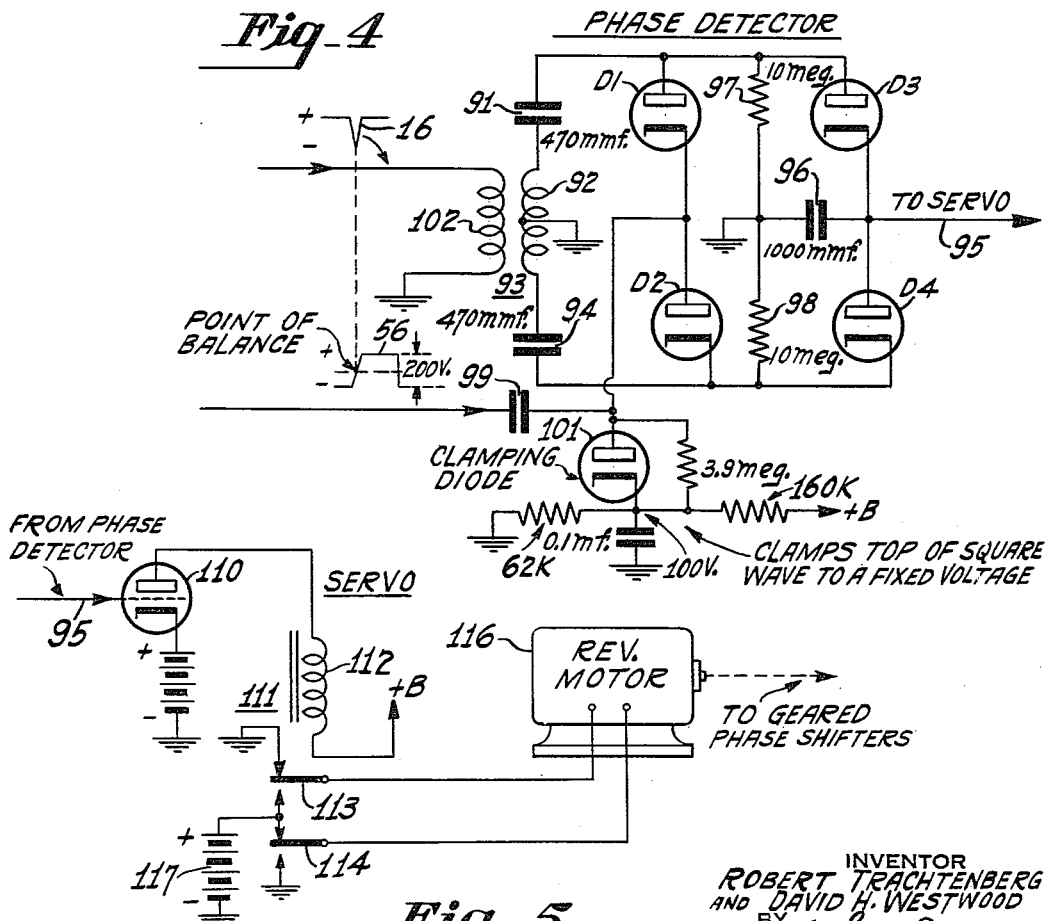

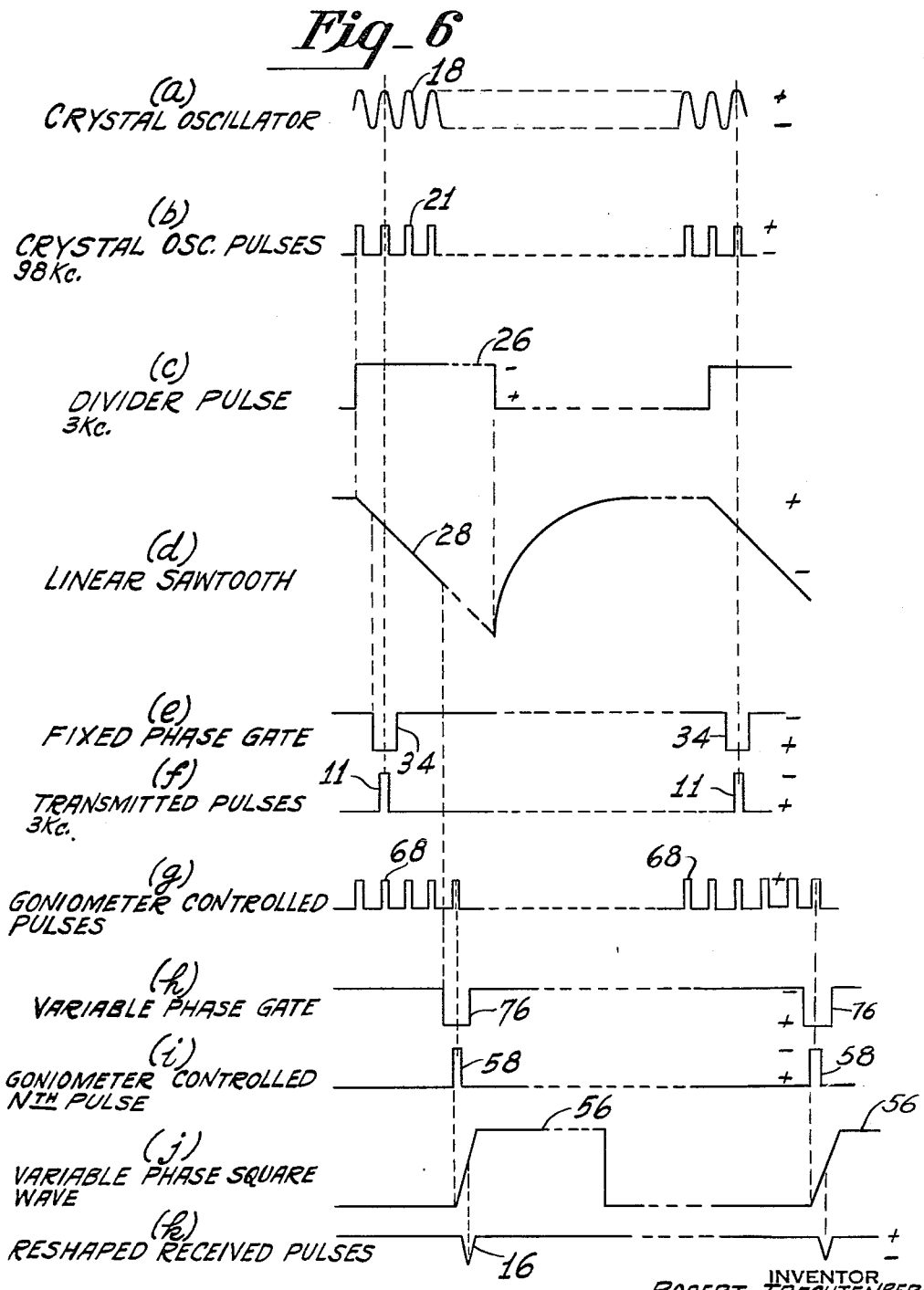

2,713,160

PULSE-ECHO DISTANCE MEASURING SYSTEMS

Robert Trachtenberg, Camden, and David H. Westwood, Haddonfield, N. J., assignors to Radio Corporation of America, a corporation of Delaware Application August 3, 1950, Serial No. 177,486

7 Claims. (Cl. 343—7.3)

Our invention relates to radio distance determining systems such as radio altimeters and particularly to systems of the pulse-echo type that provide a direct reading as by means of a pointer and dial.

An object of the invention is to provide an improved pulse-echo distance measuring system.

A further object of the invention is to provide an improved pulse-echo distance measuring system of the type having a servo system wherein a shaft assumes an angular position that is a function of distance.

A still further object of the invention is to provide a pulse-echo distance measuring system of improved accuracy and of improved reliability in operation, and particularly to provide an accurate measuring system in which the servo system will not "overshoot."

In practicing the invention there is employed a system of the type wherein the time interval between transmission of a pulse and reception of said pulse after reflection from the target (the earth's surface in the case of an altimeter) is determined by comparing the phase of the reflected pulse with the phase of a comparison wave that has been shifted in phase a known amount with respect to the transmitted pulse. A system of this general type is described, for example, in application Serial No. 77,178 filed February 18, 1949 in the name of Randall C. Ballard and entitled "Pulse Echo Distance Measuring Systems," now Patent No. 2,638,587 issued May 12, 1953. The reflected pulse and the comparison wave are applied to a phase detector. The output of the phase detector controls a servo or follow-up circuit which drives phase shifters to shift the phase of the comparison wave. This drive continues until a balanced condition is reached. A dial calibrated in distance and a pointer connected to the phase shifters indicate altitude or distance. It has been found that while the system described in said Ballard application is generally satisfactory, it is not a simple matter to so design it that the servo system will not "overshoot" at times. In the Ballard application the comparison wave is a stairstep function, the balance point occurring on one selected steep front. The time during which the reflected pulse is on this steep front as the servo approaches balance is of too short duration for the high speed servo operation desired in some cases. This does not give the servo enough anticipation and the result causes overshoot. With a given steepness of wave front the anticipation time can be increased only by increasing the amplitude of the step. Practical considerations limit the amplitude of the comparison wave of which one step is only a portion.

In accordance with a preferred embodiment of the present invention, the comparison wave that is applied to the phase detector is a rectangular wave that has its steep rising slope or front edge locked in with the reflected pulse by means of the follow-up circuit. The amount and polarity of the D.-C. voltage applied to the servo or follow-up depends upon the phase of the reflected pulse with respect to said front edge of the rectangular wave.

The phase or timing of said rectangular wave is controlled very precisely by means of a precisely controlled pulse which triggers a multivibrator to generate the rectangular wave serving as said comparison wave. In a preferred embodiment this wave is substantially a square wave.

The precisely controlled pulse for triggering the multivibrator is obtained by means of a geared phase shifter arrangement of the general type described in application Serial No. 640,596 filed January 11, 1946 in the name of A. D. Blumlein and E. L. C. White and entitled "Methods and Apparatus for the Control of the Timing of Recurrent Signals," now Patent No. 2,688,077 issued August 31, 1954.

With our above-described arrangement, there is obtained precise control of a phase comparison wave which has a steep front of large voltage rise for effecting control of the servo. The peak to peak voltage of the comparison wave in a preferred embodiment is about 200 volts and the balance point is approximately one-half way up the steep slope. Thus, "overshooting" by the servo is substantially eliminated since the full amplitude of the comparison wave is used when generating the steep front on which the balance point occurs. In other words, when the servo drives the comparison wave to a position where a reflected pulse coincides with said steep front, the reflected pulse will remain on said steep front where the system will follow precisely and accurately indicate the altitude or distance. At the same time, the width of the comparison square wave is great enough to insure that the measuring system will "lock in" for any reflected pulses received from a reflecting surface within the operating range of the system.

The invention will be better understood from the following description taken in connection with the accompanying drawings in which:

Fig. 1 is a block diagram of an altimeter embodying our invention,

Fig. 2 is a circuit diagram of a phase shifter employed in the altimeter shown in Fig. 1, Fig. 3 is a circuit diagram of a pulse selector employed in the altimeter shown in Fig. 1, Fig. 4 is a circuit diagram of a phase detector employed in the altimeter shown in Fig. 1, Fig. 5 is a circuit diagram of a servo system employed in the altimeter shown in Fig. 1, and Fig. 6 is a group of graphs that are referred to in explaining the operation of the altimeter shown in Fig. 1.

Referring to Fig. 1 of the drawing, the altimeter comprises a pulse transmitter 10 that transmits radio pulses of a certain periodic rate with each pulse of very short duration. This is in accordance with conventional pulse-echo radar practice. The transmitter 10 is modulated by periodically recurring pulses 11.

The reflected pulses are received by a receiver 12, demodulated and amplified and applied either directly to a phase detector 13 or through a pulse shaper 14 comprising a gas or vapor tube that breaks down and produces a sharp pulse 16 each time a reflected pulse is impressed upon it.

*Pulse transmission channel*

Reference will now be made to the portion of the circuit of Fig. 1 for generating the transmitter modulating pulses 11. A stable sine wave oscillator 17, which preferably is a crystal controlled oscillator, generates a sine wave 18 which has a frequency of 98.323 kc. in the example described. The sine wave signal 18 is passed through a limiter or clipper 19 and the resulting 98 kc. pulses 21 are applied to a pulse selector 22 (shown in detail in Fig. 3). Refer to both Fig. 1 and Fig. 6 for an illustration of the various wave forms and their phase relation.

The 98 kc. signal 18 is also passed through a clipper 23 and applied to a suitable frequency divider 24 which may consist of a plurality of multivibrator stages. In the present example the divider 24 divides by 32 to produce a rectangular wave 26 having a repetition rate of 3 kc. This is the repetition rate that is desired for the transmitter modulating pulses 11.

The pulses 26 drive a linear sawtooth generator 27 to produce a negative going sawtooth wave 28 having a repetition rate of 3 kc. Circuits for producing such sawtooth waves are well known in the art and need not be described in detail.

The sawtooth wave 28 is applied to an adjustable phase shifter circuit 29 for the purpose of obtaining 3 kc. pulses that are adjustable in phase. The phase shifter 29 preferably is of the type shown in detail in Fig. 2. This phase shifter is described in application Serial No. 151,677 filed March 24, 1950 in the name of D. H. Westwood and entitled "Electrical Pulse Delay Circuit," now Patent No. 2,599,305 issued June 6, 1952. As will be described hereinafter in connection with Fig. 2, the phase shifter 29 produces pulses 31 having front edges adjustable in timing or phase. The pulses 31 are passed through a differentiating circuit 32 to produce wave 33 that includes a negative pulse having the same timing as the front edge of pulse 31. This negative pulse is reversed in polarity to provide pulse 34 by a polarity reverser 36 such as a single stage amplifier and applied to a grid of the pulse selector 22 (see Fig. 3).

The pulse selector output consists of the modulating pulses 11. These pulses 11 are pulses from the wave 21 which have been selected by the wave 34. Thus, the output pulses 11 have the accuracy and stability of the 98 kc. pulses 21 and the 3 kc. repetition rate of the pulses 34.

Fig. 3 shows one suitable form of pulse selector. Such circuits are also referred to as coincidence circuits. In the example shown, the circuit comprises a six-element vacuum tube 36 which is adjusted to pass signal only when there are positive signal voltages applied simultaneously to the two input grids. More specifically the input grids are negatively biased sufficiently to prevent a flow of plate current if signal is on only one input grid. This bias is provided by grid leak biasing action well known in the art. Thus, one of the pulses 21 can appear in the output circuit of the pulse selector 22 only when a pulse 34 is coincident with one of the pulses 21. Said one pulse then appears in the output as the pulse 11.

It will be understood that there are various other forms of pulse selectors that may be employed in place of the particular one illustrated.

Referring more specifically to the phase shifter 29, it should first be noted that the invention is not limited to the use of this particular type of phase shifter. However, the phase shifter 29 and the phase shifter 41, described hereinafter, preferably are substantially identical so that any undesired phase shift due to voltage or temperature changes that may occur will produce like shifts in the pulse transmission channel and the comparison pulse channel. Thus, the effect of such undesired phase shifts will cancel out and not affect the accuracy of the distance reading.

It will be noted that the purpose of the phase shifter 29 is to select by means of the gate pulse 34 the time of triggering or keying of the transmitter 10. Normally the first of the 98 kc. pulses 21 immediately following the start of the negative sawtooth wave 28 is selected as illustrated in Fig. 6 to obtain the transmitter pulse 11.

For calibration purposes it may be desirable to have the phase shifter 29 adjustable in steps. In this case, referring to Fig. 2, which is described in detail below, the right hand section of the potentiometer 48 may be tapped and a cooperating switch arm (operated by a knob 30, Fig. 1) provided rather than a continuously variable contact point. Thus, by tapping at the proper points along the potentiometer the gate pulse 34 (Figs. 1 and 16) can be shifted in steps to select any desired one of the pulses 21 for keying the transmitter.

Thus, the transmitted pulse can be shifted in steps of 5000 feet, the crystal oscillator frequency being selected so that the period of one cycle corresponds to the time required for a transmitted pulse to travel 5000 feet and back. Therefore, if some of the transmitted pulse signal is fed into the receiver, the receiver indicator 84 may readily be calibrated in steps of 5000 feet throughout the range of the system.

*The phase shifter 29*

Fig. 2 shows the details of the phase shifter 41. The phase shifters 29 and 41 are the same except that 29 provides a phase shift in steps for calibration purposes whereas 41 provides a continuously variable phase shift. The sawtooth wave 28 is applied with negative polarity through a coupling capacitor 42 to the grid of a vacuum tube V1. The tube V1 and a tube V2 have a common cathode resistor 43. In the example shown, the tubes V1 and V2 are each one-half of a vacuum tube type 12AX7.

Anode potential is applied directly to the anode of the tube V1 whereby the tube V1 acts as a cathode follower. Anode potential is applied to the anode of the tube V2 through an anode resistor 44.

The delayed output pulse 71 is taken off the anode of tube V2. This corresponds to the output pulse 31 of the phase shifter 29.

Referring now to the grid biasing means for the two tubes, the tube V1 has bias voltage applied to its grid through a grid resistor 46. This bias voltage is supplied from a variable tap 47 on one section of a potentiometer 48. This potentiometer is connected across the anode voltage supply for the tubes V1 and V2. In the specific example shown, the potentiometer 48 consists of three resistor sections, the middle section being adjustable to permit adjusting the amount of phase change of the output pulse 31 for a given change in the position of the variable tap 47.

By varying the position of the tap 47 and thereby varying the bias on the tube V1, the timing of the front edge of the output pulse 71 is varied as will be explained hereinafter.

The tube V2 has bias applied to its grid by way of a lead 49. The bias is supplied from a potentiometer 51 that is connected across the anode supply of the tubes V1 and V2. In the specific example illustrated, the potentiometer 51 consists of three resistor sections, and the bias is taken off the middle section by a tap 52 that preferably is adjustable.

Tap 47 determines the D.-C. operating level of the applied voltage wave, thus, the voltage on the grid at any particular time is the sum of the D.-C. voltage on tap 47 and the instantaneous value of the applied sawtooth wave referred its average value. As previously stated, during a positive portion of the applied sawtooth wave and before the negative going portion begins, tube V1 is conducting and tube V2 is biased to cut-off. It will be noted that the flow of current from V1 through cathode resistor 43 makes the cathode of tube V2 positive with respect to its grid and thus biases tube V2 to cut-off. Under this condition the output voltage at the anode of tube V2 is a maximum and is equal to the plus B voltage, which, in this instance, is 300 volts. The tap 52 furnishes the bias to the grid of V2 and hence determines the voltage to which the cathode of V2 must be lowered in order to start anode to cathode conduction in V2.

Now consider the circuit action when the negative going portion of the applied sawtooth wave 28 begins. Cathode follower action of V1 causes the voltage across cathode resistor 43 also to go more negative and finally a point is reached on the negative slope of 28 at which the cathode to grid voltage of V2 is such as to cause anode to cathode conduction in V2. This is indicated by the broken line at graph 28. As a result of V2 becoming conducting, its anode voltage drops, thereby producing the front edge of the output pulse 71. When V2 is fully conducting the voltage across the cathode resistor 43 is held to a constant value near that of the grid voltage and determined by the tube characteristics of V2. As the voltage wave on the grid of V1 continues to go more negative, the conduction through V1 is cut-off. Thus the front edge of pulse 71 has been caused to occur at a time delayed by an amount determined both by the shape of the applied voltage wave and the relative value of bias voltages on taps 47 and 52.

Described differently the circuit action is thus: The bias voltage set by tap 52 determines the voltage necessary on the cathode of V2 to cause conduction in V2 while the bias voltage furnished by the tap 47 determines at which point on the applied wave this particular voltage is caused to occur on the cathode of V2 by the cathode follower action of V1. Therefore, as the tap 47 is varied, the point on the applied wave at which V2 conducts is varied, thus varying the delay of the leading edge of the output pulse.

The pulse 71 remains at a fixed reduced voltage value so long as the tube V2 conducts and the tube V1 remains cut-off. As the voltage of sawtooth wave 11 rises during the return period, a point is reached where tube V1 again becomes conducting and the tube V2 is again driven to cut-off. This produces the back edge of the pulse 71.

It should be noted that as the tap 47 is varied to vary the delay of output pulse 71, there is no change in the amplitude of the pulse 71 since the operating characteristics of the tube V2 remain unchanged.

The pulse 71 is differentiated by a differentiating circuit 72 comprising a small capacity capacitor 53 and a resistor 54. The resulting wave is indicated at 73.

The comparison pulse channel

Reference will now be made to the complete circuit for producing the rectangular comparison wave that is applied to the phase detector 13. This wave is indicated at 56 and is the output of a square wave generator 57 which preferably is a one-shot multivibrator. The comparison wave 56 has the desired steep front with a large voltage rise and it has the necessary width to insure that the servo will always be driven in the proper direction toward a point of balance.

Control pulses 58 of 3 kc. repetition rate from a pulse selector 59 trigger the square wave generator 57. The control pulses 58 are shifted in phase automatically as the altitude (or target distance) changes, thereby shifting the phase of the comparison wave 56. Because of the way in which the control pulses 58 are obtained, they necessarily are of short duration.

The circuit for generating the control pulses 58 and for shifting their phase will now be described.

The sine wave 18 from the crystal oscillator 17 is passed through a goniometer type phase shifter 61 which may be of conventional construction comprising two stator coils 62 and 63 positioned 90 degrees apart and a rotor coil 64. The sine wave signal 18 is fed to one of the stator coils through a quadrature network 66 to provide a 90 degree phase shift.

Signal from the rotor coil 64 is passed through an amplifier and clipper 67 and the resulting 98 kc. pulses 68 are applied to the pulse selector 59.

Sawtooth wave voltage 28 from the sawtooth generator 27 is applied to the variable phase shifter 41 which, as previously stated, is the same as the phase shifter 29 except that it is operated to provide a continuously variable phase shift as described below. The output wave 71 from phase shifter 41 is passed through the differentiating circuit 72 to provide the wave 73 which is reversed in polarity by a polarity reverser 74. The resulting positive polarity pulse 76 is applied to the pulse selector 59.

The pulse selector 59 may be the same as the pulse selector 22, the circuit of which is shown in Fig. 3.

From the foregoing it will be apparent that the selector output pulses 58 have the 3 kc. repetition rate of the pulses 76 and have the stability and phase shift accuracy of the 98 kc. pulses 68.

The control pulses 58 are made continuously variable in phase by gearing the two phase shifters 41 and 61 together by means of gears 81, shafts 80 and 83 driving the phase shifters 41 and 61, respectively. Since the frequency divider 24 divides by 32, the gear ratio of the gears 81 is such that the phase shifter 61 is rotated 32 electrical degrees to 1 electrical degree shift in the phase shifter 41. Thus, a pulse 76 and a selected one of the pulses 68 remain coincident as the phase shifters 61 and 41 are rotated.

Phase detector and servo system

As previously stated, the control pulses 58 and, therefore, the comparison waves 56, are shifted automatically in phase by the servo operation until a balanced condition is reached. The geared phase shifters 61 and 41 are driven by a servo device 81 as indicated by the broken lines 82. The servo 81 is controlled by the output of the phase detector 13. An altitude or distance indicator 84 is connected to the phase shifters as indicated by a broken line 86. Any suitable indicator may be provided. In the simple form illustrated a rotatable pointer 84a is connected directly to the shaft driving the phase shifter rotor 64. A dial 84b is calibrated in feet. It will be understood that the altimeter may be used for automatic control purposes, in which case no altitude indicator may be provided. The important thing is that the servo output shaft of the system assumes an angular position that is an accurate indication of altitude or distance.

Figs. 4 and 5 show circuit diagrams of a suitable phase detector and of a simple servo, respectively. Actually, the servo system illustrated is not a preferred form and is selected for purpose of illustration in place of more desirable circuits in order to simplify the description. Various servo systems of more refined design are well known in the art.

The phase detector in the specific example illustrated is of the type described in Patent No. 2,250,284 issued July 22, 1941, in the name of Karl R. Wendt. The particular circuit shown in Fig. 4 comprises four diodes D1, D2, D3 and D4. The diodes D1 and D2 are connected in series cathode to anode in one branch and the diodes D3 and D4 are connected in series cathode to anode in a second branch. The anodes of diodes D1 and D3 are connected through a capacitor 91 to one terminal of the secondary 92 of a transformer 93. The cathodes of the diodes D2 and D4 are connected through a capacitor 94 to the other terminal of secondary 92. The mid-point of secondary 92 is grounded.

A storage capacitor 96 is connected between ground and the junction point of the cathode of diode D3 and the anode of diode D4. The voltage appearing across this capacitor is applied to the servo system by a lead 95.

High impedance resistors 97 and 98 of like value are connected across the two diode branches and grounded at their mid-point. It will be noted that these resistors are in shunt to the capacitors 91 and 94 whereby the diodes are suitably biased to be non-conducting between applied pulses as described hereinafter. This corresponds to a grid-leak biasing action.

The comparison wave 56 is applied through a coupling capacitor 99 to the junction point of the cathode of diode D1 and the anode of D2. This junction point is connected to the anode of a clamping diode 101 which clamps the top of the comparison wave 56 to a fixed voltage. In the example given where the peak to peak voltage of comparison wave 56 is 200 volts, the cathode of diode 101 is held at 100 volts, for example. This sets the point of balance half-way up on the front slope of wave 56. This balance point is effectively at ground potential due to the clamping action.

The pulses 16, which correspond to the reflected pulses, are applied to the primary 102 of the transformer 93.

In operation, if the pulse 16 is coincident with the balance point on the front edge of wave 56, there will be no voltage applied to the storage capacitor 96 and, therefore, no voltage will be applied to the servo system. If pulse 16 falls above this balance point, capacitor 96 will be charged in one direction. If pulse 16 falls below this balance point, capacitor 96 will be charged in the opposite direction.

Fig. 5 illustrates one form of servo control system merely by way of example. It comprises an amplifier tube 110 which has its control grid D.-C. connected to the output terminal of the storage capacitor 96 of the phase detector. Relay 111 in the motor control circuit is a three position relay having "up," "down," or "center" position. The tube 110 which controls the relay is biased in such a manner to cause the relay to assume a "center" position with zero voltage on the grid of the tube 110. When the phase detector voltage 95 goes positive, the relay closes to one position (say the "up" position); when the voltage 95 goes minus, the relay closes to the opposite position ("down" position). The "up" position results in a motor rotation in one direction whereas the "down" position results in a motor rotation in the opposite direction. In the "center" position the motor is not energized. Thus a reversible motor 116 driven by a battery 117 is driven in one direction or the other depending upon whether a positive or a negative voltage is supplied from the phase detector 13.

It will be evident that the servo drives the geared phase shifters so as to bring the phase detector to a balanced condition if the altitude or target distance is constant, and to bring the phase detector toward and very close to a balanced condition if the distance is constantly changing. Thus, the altimeter always gives an accurate reading of distance.

As previously pointed out, an important advantage of the present invention is that the front edge of the rectangular comparison wave 56 has a large voltage rise so that any tendency of the servo system to overshoot is minimized. The peak-to-peak voltage of comparison wave 56 is about 200 volts in the particular embodiment described. Thus, operation on the front edge of the wave 56 provides a good voltage output at the phase detector for control of the servo system. Also, because of the width of the comparison wave 56, the servo will always be operated to bring the reflected pulse onto the front edge of wave 56.

What we claim to be our invention is:

1. A pulse-echo distance measuring system comprising means for transmitting periodically recurring pulses of energy toward an object, means for receiving said pulses after reflection from said object, means for producing control pulses having an adjustable time relation with respect to said transmitted pulses, said last means comprising means for producing a first periodic signal having a frequency that is a multiple of the repetition rate of said transmitted pulses, a phase shifter for shifting the phase of said first periodic signal, means for producing a second periodic signal which has a repetition rate that is a submultiple of said periodic signal, a second phase shifter for shifting the phase of said second periodic signal, said phase shifters being geared together to maintain coincidence of a cycle of said second periodic signal and a selected cycle of said first periodic signal, a pulse coincidence circuit to which the outputs of said phase shifters are applied whereby there is obtained a periodic control pulse having the repetition rate of said second periodic signal and the phase stability and accuracy of said first periodic signal, means for converting said control pulse into a rectangular wave of at least several times the duration of said control pulse, a phase detector, means for comparing in said phase detector the phase relation of said rectangular wave and the reflected pulse, and servo means driven by the output of said phase detector, said servo means being mechanically coupled to said phase shifters to drive them to a position to bring said rectangular wave to a predetermined phase relation with respect to a reflected pulse.

2. A pulse-echo distance measuring system comprising a stable oscillator operating at a certain frequency, means for transmitting periodically recurring pulses of energy toward an object with said pulses recurring in a definite time relation to the output of said oscillator and at a rate that is a submultiple of said certain frequency, means for receiving said pulses after reflection from said object, means for producing control pulses having an adjustable time relation with respect to said transmitted pulses, said last means including said oscillator for supplying a periodic signal of said certain frequency, a phase shifter for shifting the phase of said periodic signal, means for producing a second periodic signal which has a repetition rate that is a submultiple of said periodic signal, a second phase shifter for shifting the phase of said second periodic signal, said phase shifters being geared together to maintain coincidence of a cycle of said second periodic signal and a selected cycle of said first periodic signal, a pulse coincidence circuit to which the outputs of said phase shifters is applied whereby there is obtained a periodic control pulse having the repetition rate of said second periodic signal and the phase stability and accuracy of said first periodic signal, means for converting said control pulse into a rectangular wave of at least several times the duration of said control pulse, a phase detector, means for comparing in said phase detector the phase relation of said rectangular wave and the reflected pulse, servo means driven by the output of said phase detector, said servo means being mechanically coupled to said phase shifters to drive them to a position to bring said rectangular wave to a predetermined phase relation with respect to a reflected pulse.

3. A pulse-echo distance measuring system comprising a stable sine wave oscillator that produces a sine wave signal of a certain frequency means including a frequency divider fed from said oscillator for producing pulses recurring at a repetition rate that is a submultiple of said certain frequency, means for deriving transmitter modulating pulses from said submultiple frequency pulses, a radio transmitter, means for modulating said transmitter by said modulating pulses to produce radio pulses that are radiated toward a reflecting object, a receiver for receiving said pulses after reflection, means including a first phase shifter through which said sine wave signal is passed for producing phase shifted pulses of said certain frequency, a pulse coincident circuit to which said phase shifted pulses are applied, a second phase shifter, means for passing some of said submultiple frequency pulse signal through said second phase shifter for obtaining submultiple frequency pulses shifted in phase, means for applying said phase shifted submultiple frequency pulses to said pulse coincident circuit whereby phase shifted control pulses appear in the output circuit of said pulse coincident circuit, said phase shifters being geared together to maintain coincidence of a submultiple frequency pulse and a selected one of said certain frequency pulses, means for converting said control pulses to rectangular comparison pulses which are of large voltage amplitude and which have a width that is several times that of said control pulses, a phase detector, means for comparing in said phase detector the phase of said comparison pulses and said reflected pulses, and means for driving said phase shifters in a direction to bring said comparison pulses and said reflected pulses to a predetermined phase relation, said last means comprising a servo system that is driven by the output of said phase detector and which drives said phase shifters.

4. A pulse-echo distance measuring system comprising a stable sine wave oscillator that produces a sine wave signal, means including a frequency divider fed from said oscillator for producing pulses recurring at a repetition rate that is a submultiple of the frequency of said sine wave signal, means for deriving transmitted modulating pulses from said submultiple frequency pulses, a radio transmitter, means for modulating said transmitter by said modulating pulses to produce radio pulses that are radiated toward a reflecting object, a receiver for receiving said pulses after reflection, a first phase shifter, means for passing said sine wave signal through said first phase shifter, means for clipping said signal after it has passed through said phase shifter, a pulse coincident circuit to which said clipped signal is applied, a second phase shifter, means for passing some of said submultiple frequency pulse signal through said second phase shifter for obtaining submultiple frequency pulses shifted in phase, means for applying said phase shifted submultiple frequency pulses to said pulse coincident circuit whereby phase shifted control pulses appear in the output circuit of said pulse coincident circuit, said phase shifters being geared together to maintain coincidence of a submultiple frequency pulse and a selected one of the higher frequency pulses, means for converting said control pulses to rectangular comparison pulses which are of large voltage amplitude and which have a width that is several times that of said control pulses, a phase detector, means for comparing in said phase detector the phase of said comparison pulses and said reflected pulses, and means for driving said phase shifters in a direction to bring said comparison pulses and said reflected pulses to a predetermined phase relation, said last means comprising a servo system that is driven by the output of said phase detector and which drives said phase shifters.

5. A pulse-echo distance determining system comprising a stable oscillator for producing a sine wave signal having a certain repetition rate, a frequency divider fed from said oscillator for producing a signal having a repetition rate that is a submultiple of said certain rate, means for converting said submultiple signal into a linear sawtooth wave, a first phase shifter circuit to which said sawtooth wave is supplied, said phase shifter circuit including means for clipping said sawtooth wave and for adjusting the clipping level, means for deriving transmitter modulating pulses from the output of said phase shifter circuit, a radio transmitter, means for modulating said transmitter by said modulating pulses whereby radio pulses are transmitted toward an object and reflected back, a receiver for receiving said reflected pulses, a goniometer type phase shifter through which some of said sine wave signal is passed to produce a phase shifted sine wave signal, means for clipping said phase shifted sine wave signal to produce phase shifted pulses of said certain repetition rate, a pulse coincident circuit to which said last-mentioned pulses are applied, a second phase shifter circuit which is substantially a duplicate of said first phase shifter circuit, means for supplying said sawtooth wave to said second phase shifter circuit, means for deriving phase shifted pulses from the output of said second phase shifter circuit, means for supplying said last-mentioned pulses to said pulse coincidence circuit whereby control pulses appear in its output circuit, said goniometer type phase shifter and said second phase shifter circuit being geared together to maintain coincidence of a submultiple frequency pulse and a selected pulse of said certain repetition rate, means for converting said control pulses into rectangular waves of substantially greater duration or width than that of the control pulses, a phase detector, means for comparing in said phase detector the phase relation of said rectangular waves and said reflected pulses, and means for driving said geared phase shifters in a direction to bring said rectangular waves and said reflected pulses to a predetermined phase relation, said last means comprising a servo system that is driven by the output of said phase detector and which drives said geared phase shifters.

6. A pulse-echo distance determining system comprising a stable oscillator for producing a signal having a certain repetition rate, a frequency divider fed from said oscillator for producing a signal having a repetition rate that is a submultiple of said certain rate, means comprising a phase shifter circuit adjustable in steps for producing a gate pulse adjustable in phase or timing, means for deriving pulses from said sine wave signal which pulses have said certain repetition rate, means comprising a pulse selector to which said gate pulse and said last-mentioned pulses are applied for selecting any desired one of said last-mentioned pulses as a function of said step adjustment of the phase shifter whereby selected pulses may be utilized for calibration, a radio transmitter, means for pulsing said transmitter in response to the occurrence of said selected pulse whereby radio pulses are transmitted toward an object and reflected back, a receiver for receiving said reflected pulses, means for feeding a portion of said calibration pulse into the receiver for calibration purposes, means for producing control pulses that are variable in phase with respect to said transmitted pulses, said last means including a second phase shifter, means for producing a rectangular comparison wave in synchronism with said control pulses, a phase detector, means including said phase detector for comparing the phase of said comparison wave and the reflected pulses, a servo system coupled to said second phase shifter to drive it, and means supplying the output of said phase detector to said servo system to drive it whereby in operation said comparison wave is shifted in phase in a direction to stop the operation of the servo system.

7. A pulse-echo distance determining system comprising a stable oscillator for producing a sine wave signal having a certain repetition rate, a frequency divider fed from said oscillator for producing a signal having a repetition rate that is a submultiple of said certain rate, means for converting said submultiple signal into a linear sawtooth wave, a first phase shifter circuit to which said sawtooth wave is supplied, said phase shifter circuit including means for clipping said sawtooth wave and means adjustable in steps for adjusting the clipping level to thereby produce a gate pulse having a selected phase or timing, means for deriving pulses from said sine wave signal which pulses have said certain repetition rate, means comprising a pulse selector to which said gate pulse and said last-mentioned pulses are applied for selecting any desired one of said last-mentioned pulses as a function of said step adjustment of said phase shifter whereby selected pulses may be utilized for distance calibration, a radio transmitter, means for pulsing said transmitter in response to the occurrence of said selected pulse whereby radio pulses are transmitted toward an object and reflected back, a receiver for receiving said reflected pulses, a goniometer type phase shifter through which some of said sine wave signal is passed to produce a phase shifted sine wave signal, means for clipping said phase shifted sine wave signal to produce phase shifted pulses of said certain repetition rate, a pulse coincident circuit to which said last-mentioned pulses are applied, a second phase shifter circuit which is substantially a duplicate of said first phase shifter circuit, means for supplying said sawtooth wave to said second phase shifter circuit, means for deriving phase shifted pulses from the output of said second phase shifter circuit, means for supplying said last-mentioned pulses to said pulse coincidence circuit whereby control pulses appear in its output circuit, said goniometer type phase shifter and said second phase shifter circuit being geared together to maintain coincidence of a submultiple frequency pulse and a selected pulse of said certain repetition rate, means for converting said control pulses into rectangular waves of substantially greater duration or width than that of the control pulses, a phase detector, means for comparing in said phase detector the phase relation of said rectangular waves and said reflected pulses, and means for driving said phase shifters in a direction to bring said rectangular waves and said reflected pulses to a predetermined phase relation, said last means comprising a servo system that is driven by the output of said phase detector and which drives said geared phase shifters.

References Cited in the file of this patent

UNITED STATES PATENTS

| | | |
|---|---|---|
| 2,455,265 | Norgaard | Nov. 30, 1948 |
| 2,516,765 | Ferrill | July 25, 1950 |
| 2,517,540 | Busignies | Aug. 8, 1950 |

FOREIGN PATENTS

| | | |
|---|---|---|
| 124,653 | Australia | July 3, 1947 |